(12) United States Patent
Feltes et al.

(10) Patent No.: US 10,801,472 B2
(45) Date of Patent: Oct. 13, 2020

(54) METHOD FOR CONTROLLING A POWER VALUE OF AN OFFSHORE WIND ENERGY SYSTEM

(71) Applicants: Christian Feltes, Hamburg (DE); Jörn Runge, Marklohe (DE)

(72) Inventors: Christian Feltes, Hamburg (DE); Jörn Runge, Marklohe (DE)

(73) Assignee: innogy SE, Essen (DE)

( * ) Notice: Subject to any disclaimer, the term of this patent is extended or adjusted under 35 U.S.C. 154(b) by 0 days.

(21) Appl. No.: 16/425,672

(22) Filed: May 29, 2019

(65) Prior Publication Data

US 2019/0277258 A1    Sep. 12, 2019

Related U.S. Application Data

(63) Continuation of application No. PCT/EP2017/073699, filed on Sep. 20, 2017.

(30) Foreign Application Priority Data

Nov. 29, 2016  (DE) .................. 10 2016 123 011

(51) Int. Cl.
*F03D 7/04*    (2006.01)
*H02J 3/38*    (2006.01)
(Continued)

(52) U.S. Cl.
CPC .............. *F03D 7/043* (2013.01); *F03D 7/048* (2013.01); *H02J 3/386* (2013.01); *H02J 3/48* (2013.01);
(Continued)

(58) Field of Classification Search
CPC .......... F03D 7/043; F03D 7/048; H02J 3/386; H02J 3/48
See application file for complete search history.

(56) References Cited

U.S. PATENT DOCUMENTS

2009/0194995 A1* 8/2009 Delmerico ............ F03D 7/0284
290/44
2013/0168963 A1    7/2013 Garcia
(Continued)

FOREIGN PATENT DOCUMENTS

DE    10 2007 044 601 A1    4/2009
DE    10 2010 056 456 A1    6/2012

OTHER PUBLICATIONS

Jens Fortmann et al., "A Novel Centralised Wind Farm Controller Utilising Voltage Control Capability of Wind Turbines," 16th PSCC, Jul. 14, 2008, 8 pages.

*Primary Examiner* — Viet P Nguyen
(74) *Attorney, Agent, or Firm* — Reinhart Boerner Van Deuren P.C.

(57) ABSTRACT

A method of controlling a power value of an offshore wind energy system in which a power set point is provided. The power set point is a power factor set point and/or a reactive power set point. At least one instantaneous reactive power state factor of the offshore wind energy system is provided, and an active power correction value is determined as a function of the provided power set point and the provided instantaneous reactive power state factor. The active power of the offshore wind energy system is controlled as a function of the determined active power correction value in such a way that the provided power set point is at least complied with.

10 Claims, 5 Drawing Sheets

(51) Int. Cl.
  *H02J 3/48*  (2006.01)
  *F03D 7/02*  (2006.01)
(52) U.S. Cl.
  CPC .......... *F03D 7/028* (2013.01); *F05B 2240/95* (2013.01); *F05B 2270/1033* (2013.01); *Y02E 10/723* (2013.01); *Y02E 10/763* (2013.01)

(56) References Cited

U.S. PATENT DOCUMENTS

| | | | |
|---|---|---|---|
| 2015/0211492 A1* | 7/2015 | Garcia | F03D 7/043 |
| | | | 290/44 |
| 2015/0249415 A1* | 9/2015 | Babazadeh | H02J 3/16 |
| | | | 290/44 |
| 2015/0270712 A1* | 9/2015 | Kanayama | H02J 3/383 |
| | | | 307/64 |
| 2015/0280629 A1 | 10/2015 | Diedrichs et al. | |
| 2016/0237990 A1* | 8/2016 | Ubben | H02J 3/1885 |
| 2016/0308369 A1* | 10/2016 | Gupta | H02J 3/16 |
| 2017/0244251 A1* | 8/2017 | Nielsen | H02H 7/067 |
| 2017/0250534 A1* | 8/2017 | Yu | H02J 3/18 |

* cited by examiner

METHOD FOR CONTROLLING A POWER VALUE OF AN OFFSHORE WIND ENERGY SYSTEM

CROSS-REFERENCE TO RELATED PATENT APPLICATIONS

This patent application is a continuation of PCT/EP2017/073699, filed Sep. 20, 2017, which claims priority to German Application No. 10 2016 123 011.1, filed Nov. 29, 2016, the entire teachings and disclosure of which are incorporated herein by reference thereto.

FIELD

The invention relates to a method for controlling a power value of an offshore wind energy system. In addition, the invention relates to a control apparatus for an offshore wind energy system and an offshore wind energy system.

BACKGROUND

Wind energy systems are increasingly used for the production of electrical energy. So-called offshore wind energy systems are preferred. The reason for this is that compared to onshore wind energy systems, the expected average wind speed and thus the expected energy output is generally higher due to the location of offshore wind energy systems.

However, offshore wind energy systems are subject to different requirements than onshore wind energy systems. In addition to the fact that the operation of an offshore wind energy system with a plurality of wind turbines and a substation or transformer station and the connection to the higher-level power grid is generally more problematic than the operation of an onshore wind energy system or its connection to the higher-level power grid due to the offshore location, clear and unambiguous grid connection conditions are also provided by the grid operator when connecting an offshore wind energy system to a (public) power grid. In particular, the grid connection conditions include specifications regarding a reactive power range or a power factor range to be provided by the offshore wind energy system.

Figure 1:
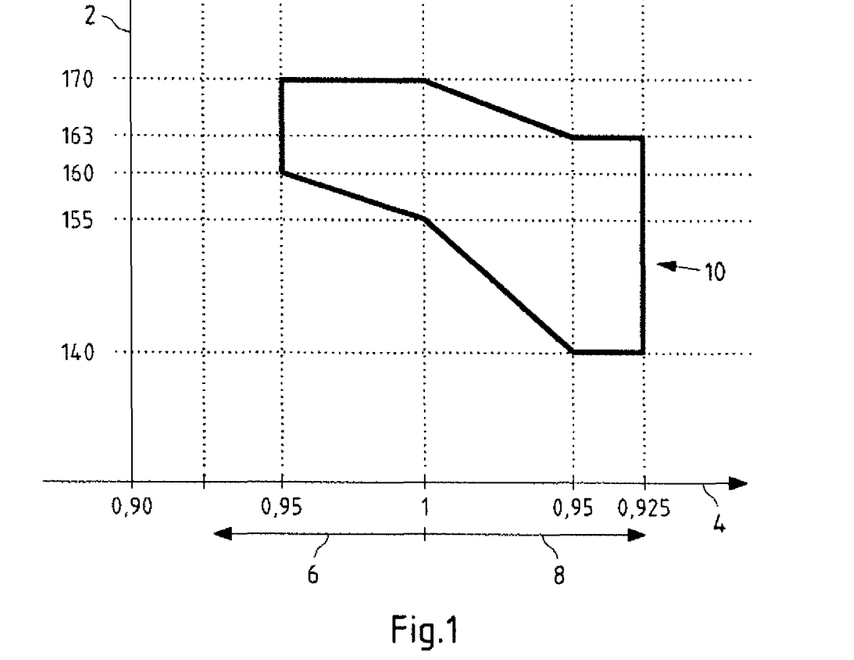
FIG. 1 shows an exemplary diagram showing the power factor range to be maintained.

FIG. 1 shows an exemplary diagram showing the power factor range 10 to be provided. The reference sign 2 indicates a first axis, in particular the conductor to conductor voltage in kV, and the reference symbol 4 indicates the further axis, in particular a power value in the form of a power factors. Furthermore, the reference sign 6 denotes the underexcited range and the reference sign 8 the overexcited range.

An offshore wind energy system can comprise a control apparatus with an active power controller and a reactive power controller to control the power value, i.e. to control the reactive and active power delivered or fed in. However, the controlling of the power value, in particular the power factor, is problematic for various reasons with regard to the complete fulfillment of the required range according to the state of the art.

In order to meet the requirements with regard to a reactive power range or with regard to a power factor range, it is known from the state of the art to provide reactive power via the power plant generators (e.g. the wind turbine(s)) and/or by installing additional components (e.g. switchable compensation coils and/or capacitors).

However, the reactive power provided by the power plant generators is usually limited to what is absolutely necessary. As a result, the provision of reactive power by the power plant generators in certain operating situations is not sufficient to meet the entire specified power factor range and in particular a current predetermined power set point value for the offshore wind energy system. For example, in operating situations with high feed-in power, a high reactive power requirement can arise in the main transformers of the offshore wind energy system (e.g. due to the high current flow through the transformer inductance), which unfavourably shifts the possible power factor range in relation to the specified requirement (in particular in the direction of the underexcited range (see FIG. 1)).

To solve this problem, an extension of the reactive power range of the offshore wind energy system through the installation of additional components is known from the state of the art. A corresponding extension is however very cost-intensive, since this can affect almost all electrical components of the offshore wind energy system (e.g. converter, transformer, cable, for doubly fed asynchronous generators if necessary also the generator) and thus a complex re-design and/or extension of the offshore wind energy system becomes necessary (including a new certification, if necessary). The installation of additional components in the transformer station or offshore substation would also be problematic due to the high costs for the components and the converted space due to the location of the offshore wind energy system.

Therefore, the object of the invention is to provide a method for controlling a power value of an offshore wind energy system, which allows in a simple way a compliance with a predetermined power factor range, in particular in operating situations with high feed-in power.

BRIEF SUMMARY

The object is solved according to a first aspect of the invention by a method for controlling a power value of an offshore wind energy system according to the present disclosure. The method comprises:

providing a power set point, wherein the power set point is a power factor set point and/or a reactive power set point, providing at least one instantaneous reactive power state factor of the offshore wind energy system, determining an active power correction value depending on the provided power set point and the provided instantaneous reactive power state factor; and controlling of the active power of the offshore wind energy system as a function of the determined active power correction value in such a way that the provided power set point is at least complied with.

Contrary to the state of the art, by controlling the fed-in active power of at least one offshore wind energy system depending on a predetermined power set point and the instantaneous reactive power state factor of the offshore wind energy system, in particular by reducing it if necessary, in a simple manner it is possible to comply with a predetermined power factor range (corresponding to the predetermined power set point), in particular also in operating situations with high feed-in power. The installation of additional components to extend the reactive power range can be omitted.

This method is used to control a power value, in particular the power factor or reactive power, of at least one offshore wind energy system. Controlling of the power value means in particular that the power delivered to a public power grid is controlled in such a way that a predetermined power set point, in particular a predetermined power factor set point and/or a reactive power set point, is complied with.

An offshore wind energy system can comprise a plurality of wind turbines which are electrically connected to a transformer station, in particular a substation, via submarine cables. A wind turbine converts the kinetic energy of the wind by means of a rotor and a generator into electrical energy, which is transmitted to the substation via the submarine cables. The substation can be electrically connected to an onshore station such as a high voltage direct current (HVDC) transmission station. For example, collecting connections may be provided in which an offshore collection station (HVDC station) can (still) be switched between them. An electrical connection can in particular be realised by at least one submarine cable. At the feed-in point into the public power grid (e.g. at the substation and/or head-end station), at least one electrical parameter can be detected in order to control the power fed into the power grid or the current fed into the power grid.

A power set point, in particular a power factor set point and/or a reactive power set point, can be specified (predetermined) by a remote entity, for example by the grid operator of the electricity grid into which the offshore wind energy system feeds the power. The power set point lies in particular within the power factor or reactive power range described above. In particular, an active power set point is not to be understood as the power set point.

In accordance with the invention, it is provided that, in order to comply with this predetermined power set point, an instantaneous reactive power state factor (or variable) of the offshore wind energy system is, in particular, determined and provided. The instantaneous (or current) reactive power state factor indicates (directly or indirectly) in particular the currently available reactive power of the offshore wind energy system. An active power correction value can be determined from the instantaneous reactive power state factor. The reactive power state factor can include in particular a power factor, a voltage and/or a reactive power.

In order to comply with the predetermined power set point, for example a power factor set point $$\lambda_{soll} = \frac{|P|}{S},$$

where P is the active power and S is the apparent power, the output active power is regulated in accordance with the predetermined active power correction value. In particular, the active power fed in can be controlled in such a way that the active power fed in is reduced.

It should be noted that for essentially sinusoidal currents and voltages, the following formula applies to the power factor set point $$\lambda_{soll} = \frac{P}{S} = \cos\varphi,$$

where $\varphi$ is the phase shift angle between S and P.

The installation of additional components can be omitted. Power value control can be provided in a simple and low-cost manner. By taking the instantaneous reactive power state factor into account, it is achieved in particular that the fed in active power is only reduced to such an extent that the predetermined power set point value is complied with. In other words, the active power is reduced only to the extent necessary to meet the predetermined power set point.

In general, there are various design options for determining the instantaneous reactive power state factor and/or for determining the active power correction value.

According to a first embodiment of the method of the present disclosure, the provision of the instantaneous reactive power factor may comprise the following:

calculating the maximum available reactive power of the offshore wind energy system as a function of the current operating condition of the offshore wind energy system and of at least one predetermined reactive power resource parameter of the offshore wind energy system.

Preferably, a plurality of predetermined or known reactive power resource parameters of the offshore wind energy system is taken into account when calculating the maximum available reactive power. A reactive power resource parameter indicates, for a component of the offshore wind energy system, in particular the amount of reactive power caused by the component (e.g. cable, transformer(s), compensation device(s), etc.). This can, for example, be documented for (almost) every component of the offshore wind energy system.

In addition to the predetermined reactive power resource parameters, the current (instantaneous) operating condition of the offshore wind energy system is detected by at least one suitable detection means and taken into account in the calculation. Preferably, at least one instantaneous switching state of the offshore wind energy system is detected and/or at least one instantaneous grid voltage of the offshore wind energy system is measured and/or at least one instantaneous operating point of at least one wind turbine of the offshore wind energy system is detected. The instantaneous maximum available reactive power can be determined almost exactly by taking the current operating state of the offshore wind energy system and the predetermined reactive power resource parameters into account in the calculation. For example, the calculation can be carried out according to the following formula:

$$Q_{max} = \Sigma Q_{WEA,max} + \Sigma Q_{Kabel} + \Sigma Q_{Trafos} + \Sigma Q_{Verbraucher} + \Sigma Q_{Kompensation,max}$$

$Q_{WEA}$ comprises the maximum reactive power of all wind turbines which are in operation, $Q_{Kabel}$ and $Q_{Trafos}$ are the load dependent and load independent reactive power of the equipment, $\Sigma Q_{Verbraucher}$ the reactive power of the loads on OSS (offshore transformer station or substation) and in nonfeeding wind turbines. Finally, $\Sigma Q_{Kompensation,max}$ is the maximum reactive power through additional compensation.

In particular, the instantaneous operating state (condition) of the offshore wind energy system is preferably determined almost continuously or regularly again. Accordingly, the calculation is carried out almost continuously or regularly again.

According to a further embodiment of the present method, determining the active power correction value may comprise calculating a maximum admissible active power set point depending on the calculated maximum available reactive power. The active power of the offshore wind energy system can be controlled as a function of the calculated maximum admissible active power set point. In particular, the calculation of the maximum active power value at which the required power factor set point or reactive power set point at the grid connection point can still be complied with can be derived from the previously calculated maximum available reactive power. This allows the active power to be controlled with the highest possible accuracy.

According to a preferred (alternative) embodiment of the method according to the present disclosure, providing of the instantaneous reactive power factor may comprise the following:

- directing at least one manipulated variable relating to at least one wind turbine from a control device of the offshore wind energy system to a control extension device,
- wherein the manipulated variable comprises a physical relationship to the instantaneous reactive power of the offshore wind energy system, and
- determining of the active power correction value by the control extension device as a function of the provided manipulated variable.

In particular, it has been recognized that an additional control extension device, which can follow after the control device of the offshore wind energy system, can easily provide power value control, such as power factor control or reactive power control, which ensures that in any operating situation the predetermined power set point (without installation of additional components) can be complied with minimum (necessary) active power reduction.

For this purpose, at least one manipulated variable of at least one wind turbines can be made available to the control extension device, in particular a limiting control device (limiting controller for short), comprising at least one controller (e.g. I or PI controller). The manipulated variable can have a (direct) physical relationship to the reactive power (e.g. reactive power, reactive current, phase angle of the complex apparent power or the current; component of the generator stator voltage directly influencing the reactive power; component of the rotor voltage directly influencing the reactive power; component of the generator stator flux chain directly influencing the reactive power, etc.). By the at least one controller of the control extension device, an active power correction value can be determined as a function of this manipulated variable. The power output can then be controlled, particularly at the feed-in point, depending on the active power correction value determined in this way. In particular, the active power correction value can be fed back to the control device of the offshore wind energy system for this purpose. The advantage of a control extension device is also that an already installed (conventional) control device of the offshore wind energy system can be easily extended in such a way that a predetermined power set point can be complied with. The control extension device may be a hardware module, a software module or a combination thereof.

However, a previously described power value control may only be necessary in certain operating situations. In accordance with a preferred embodiment of the disclosed method, at least one dead band range can be preset in the control extension device in such a way that the control extension device of the offshore wind energy system is activated only when the limitation of the control device is reached.

In comparison to the first approach, the alternative approach described here is particularly independent of equipment (resource) parameters and/or the instantaneous operating state. The control structure of the limiting control device has a suitable control structure (e.g. with PI and/or I controller) which provides the highest possible accuracy and reliability as well as sufficient dynamics to fulfil the grid connection rules, i.e. at least the power set point value, without knowledge of equipment (resource) parameters and/or operating state.

Furthermore, the limiting control device can be implemented in such a way that it only intervenes actively if the control device, in particular a reactive power controller of the control device, runs into its limitation. The output of the limiting control device can be fed back to the control device, in particular to the active power set point of a control device of the offshore wind energy system, in order to cause the active power reduction necessary to fulfil the reactive power priority or to comply with the predetermined power set point.

Preferably, an output variable of a reactive power controller of the control system can be fed to the control extension device as a first manipulated variable according to an embodiment. As at least one further manipulated variable, the control deviation of the reactive power controller of the control system can be transmitted to the control extension device. The first manipulated variable and the further manipulated variable can be added to form a summed control variable for the control extension device. In particular, this means that the control extension device can only actively intervene or be activated if there is a control deviation at the input of the control device, in particular at the input of the reactive power controller, with the same sign as at the output of the control device, in particular of the reactive power controller of the control device. It is particularly preferred that the control extension device only intervenes actively if a reactive power controller of the control device has run into its limitation and at the same time there is a control deviation at its input with the same sign as at the output. It has to be understood that with other control extension device structures, the sign can also be different (e.g. with a PI controller).

In addition, according to a further embodiment of the present disclosure it is proposed that a dead band value corresponding to the output limitation of the reactive power controller of the control device is provided as dead band range. For example, it may be a constant value that corresponds to the output limitation of the reactive power controller of the control device.

A differential value can be formed from the summed control variable and the dead band value and fed to a first controller of the control extension device. For example, the summed control variable can be subtracted from the dead band value (or vice versa). A summed value can be formed from the summed control variable and the dead band value and can be fed to at least one further controller of the control extension device. The output variable of one of the controllers, which are preferably arranged in parallel, can be fed to an active power controller of the control system as an active power correction value. This makes it possible to use a controller for control in the lower underexcited range and a controller for control in the overexcited range (see FIG. 1). In particular, only one controller of at least two controllers is always active. The output signal of the active controller can be fed to an active power controller of the control system as an active power correction value. The controller remains active and outputs an active power correction value until the applied manipulated variable of the respective controller becomes zero as a result of the active power reduction (or the limit for the active power reduction is reached). With such a control structure of a control apparatus it can be achieved that the fed-in active power is reduced without exact knowledge of the operating condition of the offshore wind energy system, if necessary, exactly as far as it is necessary for compliance with the reactive power set point or power factor set point.

According to a further embodiment, the control extension device may comprise at least one controller from the following group:

PI controller,
I controller,
Status controller
Condition observer
Fuzzy controller,
Monte Carlo controller,
Controller comprising a neural network, and
Controller based on metaheuristic optimization algorithms (e.g. particle swarm).

For example, neural networks can be set up to be trained in all variants of topologies and/or feed-in scenarios of offshore wind energy systems. A neural network can be configured and, in particular, trained in such a way that a control deviation, for example, is detected by a reactive power controller of a control device (e.g. the reactive power at the network connection node) and the neural network responds appropriately to this, whereby the limits (current, voltage) of at least one wind turbine are taken into account.

A further aspect of the invention is a control apparatus, in particular for an offshore wind energy system. The control apparatus comprises at least one input configured to receive a power set point. The power set point is a power factor set point and/or a reactive power set point. The control apparatus comprises at least one further input configured to receive at least one instantaneous reactive power state factor of the offshore wind energy system. The control apparatus comprises at least one determining unit configured to determine an active power correction value in dependence on the provided power set point and the provided instantaneous reactive power state variable. The control apparatus comprises at least one output configured to pass the determined active power correction value to an active power controller configured to control the active power of the offshore wind energy system as a function of the passed active power correction value in such a way that the provided power set point is at least complied with.

In particular, the control device may be operated in accordance with the method described above. The control device may be formed according to the control extension device described above or may include means for calculating the maximum available reactive power of the offshore wind energy system and in particular means for calculating a maximum admissible active power set point. In particular, the determining unit may comprise at least part of a control extension device or means for calculating a maximum admissible active power set point. It is also possible that the control device is at least partially formed by the control device described above and the control extension device described above. The control device can also be used for a photovoltaic system, in particular for at least one converter of a photovoltaic system.

A still further aspect of the invention is an offshore wind energy system. The offshore wind energy system comprises at least one wind turbine. The offshore wind energy system comprises at least one control device described above.

Preferably, the offshore wind energy system may comprise a plurality of wind turbines connected by submarine cables to a (common) offshore substation. The offshore substation can in turn be connected to an optional onshore head end station. The control device can, for example, be installed in the offshore substation or the onshore head end station.

It may also be provided that an offshore wind energy system may be formed by two (or more) adjacent sub offshore wind energy systems, each of which may have a plurality of wind turbines, a substation and/or a head end station. Here, the power value control, in particular the above method, can be carried out in such a way that the total power fed in by the at least two sub offshore wind energy systems is controlled in accordance with the above designs. For example, two control devices can be controlled by a higher level controller.

The characteristics of the methods, systems and apparatuses can be freely combined with each other. In particular, features of the description and/or of the dependent claims, even with complete or partial circumvention of features of the independent claims, may be independently inventive in their own right or freely combined with each other.

There is now a plurality of possibilities to design and further develop the method according to the invention, the control apparatus according to the invention and the offshore wind energy system according to the invention. In this regard, reference is made on the one hand to the patent claims subordinate to the independent patent claims, and on the other hand to the description of execution examples in connection with the drawing.

DETAILED DESCRIPTION

In the following, the same reference signs are used for the same elements.

Figure 2:
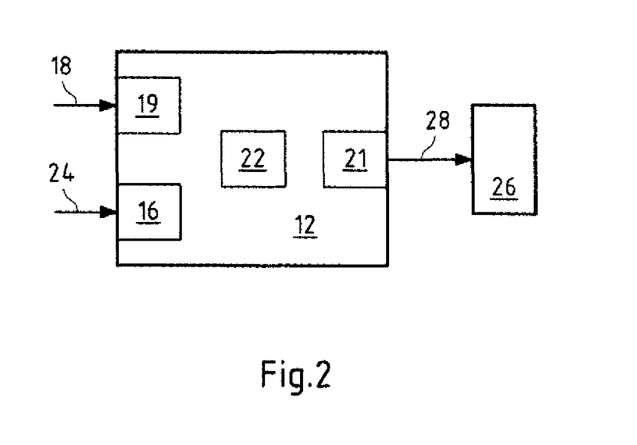
FIG. 2 shows a schematic view of an exemplified embodiment of a control apparatus in accordance with the present disclosure.

FIG. 2 shows a schematic view of an exemplified embodiment of a control apparatus 12 in accordance with the present disclosure. The control apparatus 12 shown may additionally include module 26.

As can be seen from FIG. 2, the control apparatus 12 comprises a first input 19 configured to receive a power set point. The power set point, in particular a power factor set point and/or a reactive power set point, can, for example, be provided by a server of a network operator via a communication connection 18 and, in particular, specified (preset).

The control apparatus 12 comprises at least one further input 16 configured to receive at least one instantaneous reactive power state factor of the offshore wind energy system via a further connection 24. In this case it may be provided, according to an exemplified embodiment, that providing the instantaneous reactive power state factor comprises calculating the maximum available reactive power of the offshore wind energy system as a function of the instantaneous operating state of the offshore wind energy system and of at least one predetermined reactive power resource parameter of the offshore wind energy system. Thus, the maximum available reactive power can be calculated and provided from the documented reactive power ranges of the wind turbines and the resource parameters of the offshore wind energy system (cables, transformers, compensation devices) taking into account the current operating state (switching state in the wind farm network, measured network voltages and operating points of the wind turbines). It is to be understood that the calculation can also be performed by the control device, for example the determining unit 22 and/or another module.

In addition, at least one determining unit 22 may be configured to determine an active power correction value depending on the provided power set point and the provided instantaneous reactive power state variable, such as the calculated maximum available reactive power. In particular, the determining unit 22 can also calculate the maximum active power value as an active power correction value from the calculated maximum available reactive power at which the required power factor set point or reactive power set point at the grid connection point can still be complied with.

Furthermore, the control apparatus 12 shown comprises at least one output 21. Output 21 is configured to pass the determined active power correction value to an active power controller 26 via a connection 28. The active power controller 26, for example of a control device of the offshore wind energy system, is in particular configured to control the active power of the offshore wind energy system as a function of the passed active power correction value in such a way that the provided power set point value is at least complied with. Preferably, the power set point is complied with such a way that the active power fed in is only limited to the extent that the predetermined power set point is complied with (only just). In other words, the predetermined power factor set point or reactive power set point corresponds in particular to the power factor or reactive power value of the power fed in.

Figure 3:
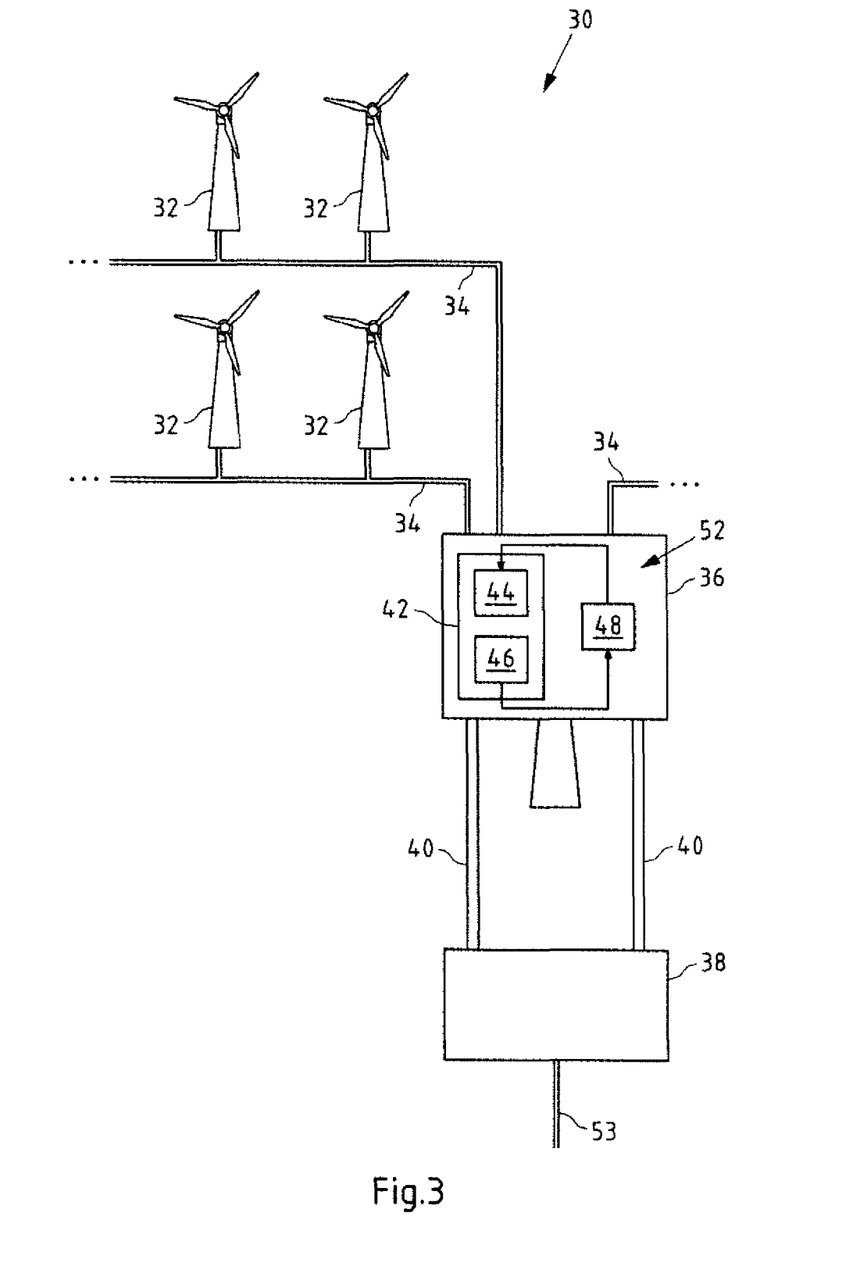
FIG. 3 shows a schematic view of an exemplified embodiment of an offshore wind energy system in accordance with the present disclosure.

FIG. 3 shows a schematic view of an exemplified embodiment of an offshore wind energy system 30 according to the present disclosure. The offshore wind energy system 30 has a plurality of wind turbines 32, which are connected to an offshore substation 36 via submarine cables 34. In particular, a submarine cable 34 is configured to transmit the electrical energy generated by a wind turbine 32 to the next wind turbine 32 or to the substation 36.

In this embodiment, a plurality of wind turbines 32 is connected in series in several strings. For example, eight strings each with six wind turbines can be provided.

For the sake of a better overview, only two strings, each with two wind turbines 32, are shown here. One end of a string is electrically connected to the substation 36 via a submarine cable 34. The other two ends can be connected via an additional (not shown) submarine cable. It is also possible to provide that one string can optionally be connected to several other strings. It goes without saying that, according to other variants of the invention, wind turbines can also be arranged in ring structures.

A communication network (not shown), which can be configured as wireless and/or wired, can be provided for communication with the wind turbines. Two further submarine cables 40 are also provided. In particular, the submarine cables 40 are configured to transmit the power generated by the offshore wind energy system 30 to a head end station 38, such as an HVDC head end station 38. The HVDC head end station 38 may be located in particular on land in order to feed the generated electricity or power into a public electricity grid. The HVDC head end station 38 may have further (not shown) transformer devices for this purpose.

In addition to (not shown) transformer devices, such as transformers, the substation 36 has here an example of a control apparatus 52. The control apparatus 52 comprises a control device 42 and a control extension device 48. In particular, the control device 42 is configured to control the current or power fed into the power grid 53. For this purpose, the control device 42 in this example has an active power controller 44 and a reactive power controller 46.

In order to maintain, in particular in every operating situation, a predetermined power set point which can be predetermined via an (not shown) input, a control extension device 48 is installed in the present embodiment, which is coupled to the control device 42. In particular, at least one manipulated variable is fed as an instantaneous reactive power state factor from the control device 42, in particular from the reactive power controller 46, to an input of the control extension device 48. Furthermore, at least one further manipulated variable is fed back from the control extension device 48 to the control device 42, in particular the active power controller 44.

The manipulated variable transmitted to the control extension device 48 comprises in particular a (direct) physical relationship to the reactive power. For example, the output of the reactive power controller 46 can have the voltage set point of the wind turbines 32 as the manipulated variable. As already described, other manipulated variables are also possible.

In particular, control extension device 48 is configured to determine an active power correction value as a function of the received manipulated variable as the manipulated variable to be returned. For this purpose, the control extension device 48 may comprise at least one controller, such as a PI controller, an I controller, a fuzzy controller, a Monte Carlo controller, a controller comprising a neural network and/or a particle swarm controller.

The active power correction value can then be fed back to control device 42. In particular, the active power controller 44 can be controlled depending on the feedback active power correction value, so that the electrical power can be fed into the power supply system 53 in compliance with the predetermined power set point.

It has to be understood that one control device 48 and one control extension device 42 can alternatively also be installed in the head end station 38. For example, with an HVDC connection, an HVDC converter alone can control the reactive power (without the influence of the WTGs) and include the control extension device. Furthermore, it is to be understood that, as an alternative to the control apparatus 52 shown, a control apparatus 12 as shown in FIG. 2 may also be provided.

Figure 4:
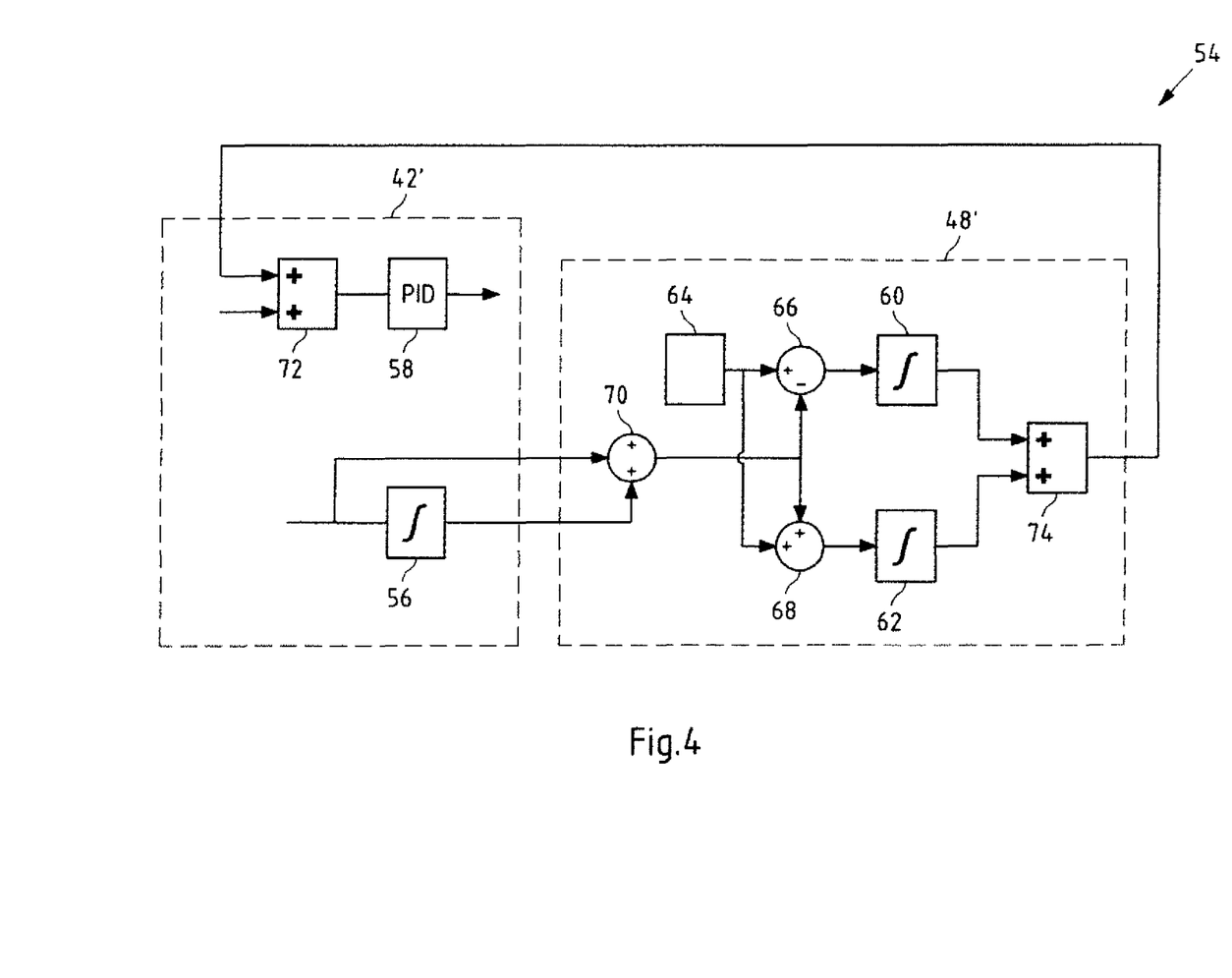
FIG. 4 shows a schematic view of a further exemplified embodiment of a control apparatus in accordance with the present disclosure.

Below is a more detailed description of a preferred embodiment of a control apparatus 54 according to the present disclosure. FIG. 4 shows a schematic view of an exemplified embodiment of a control structure 54 according to the present disclosure. The control structure 54 can, in particular, form the control apparatus 54. The control apparatus 54 comprises a control device 42' and a control extension device 48'.

The control device 42' comprises in particular a reactive power controller 56 in the form of an I controller 56 and an active power controller 58 in the form of a PI or PID controller 58. The control extension device 48' shown comprises a first controller 60 in the form of an (output limited) I controller 60 and a further controller 62 in the form of an (output limited) I controller 62. In addition, a dead band element 64 is provided which provides a constant as dead band value. It can also be seen that various addition and subtraction elements 66, 68, 70, 72, 74 are included in the control apparatus 54.

The function of the control apparatus 54 shown is explained in more detail below.

The control extension device 48' is implemented in particular as a limiting controller 48', which only intervenes actively if the reactive power controller 56 has run into its limitation and, in particular, there is simultaneously a control deviation at the input of the reactive power controller 56 with the same sign as at the output of the reactive power controller 56. The output of the limiting controller 48' is fed back to the active power set point of the control device 42' of the offshore wind energy system, in particular to the active power controller 58 via element 72, in order to cause the active power reduction necessary to fulfil the reactive power priority or the predetermined power set point. Alternatively, a multiplication element can be provided instead of a summation element.

The limiting controller 48' of the present design example has two I controllers 60, 62 arranged in parallel. At the input of the limiting controller 48', the output signal, i.e. a manipulated variable, of the reactive power controller 56 can first be added with the control deviation of the same by means of an addition element 70.

The summed control variable formed in this way is fed to a summing element 68 and a differential element 66. In particular, a differential value can be formed from the summed control variable and the provided dead band value and fed to the first controller 60 of the control extension device 48'. Furthermore, a sum value can be formed from the summed control variable and the provided dead band value and fed to a further controller 62 of the 48' control extension device.

The control deviations for the two I controllers 60, 62 can therefore be calculated from the difference and sum formed. The dead band value in the form of a constant preferably corresponds to the output limitation of the reactive power controller 56 (e.g. 0.2, as the output value in the example here is an incremental voltage set point which may not exceed 0.2 p.u.).

The two I controllers 60, 62 can each be limited in the illustrated embodiment in a range from 0 to the negative max. active power reduction (in p.u.). Due to the different signs on the summation and differential element 66, 68, respectively, of the two I controllers 60, 62, it can be achieved that the upper I controller 60 has a negative control difference at the input if the control deviation is positive and the limited output of the reactive power controller 56 is positively. In particular, I controller 60 is set up to integrate until the control difference becomes zero (or the limit for active power reduction is reached) by controlling the active power controller 58, in particular, by reducing the active power.

If the control deviation is negative and the limited output at the reactive power controller 56 is negatively, there may be a negative control deviation at the lower I controller 62. In particular, the I controller 62 is set up to integrate until the control deviation becomes zero (or the limitation for active power reduction is reached) by controlling the active power controller 58, in particular by active power reduction.

The advantage of the control structure 54 shown is in particular that the active power is reduced without precise knowledge of the operating condition of the offshore wind energy system if required exactly to the extent necessary to comply with the reactive power set point or the power factor set point.

Figure 5:
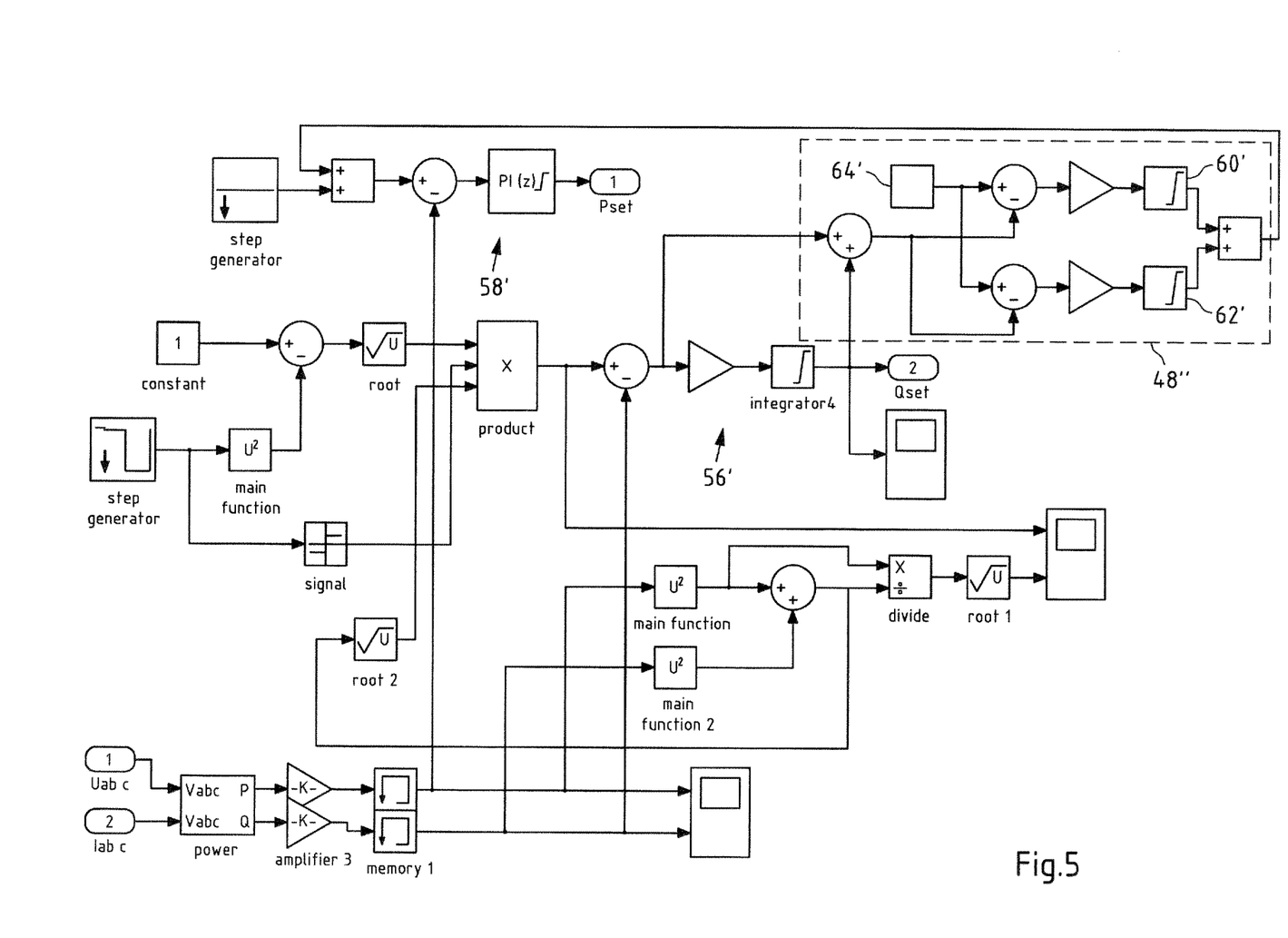
FIG. 5 shows a schematic view of a further exemplified embodiment of a control apparatus in accordance with the present disclosure.

FIG. 5 shows a further form of a control apparatus according to the present disclosure. In particular, a more detailed circuit diagram is shown comprising an active power controller 58', a reactive power controller 56' and a control extension device 48" comprising two I controllers 60' and 62' as well as a dead band element 64', as already explained in connection with FIG. 4.

It should be noted that for the connection of the limit controller 48" to another parking control variant (e.g. power factor control or voltage control), the limit controller 48" can be connected to the (limited) output and to the control deviation in the same way as for the reactive power controller. In this case only a different parameterization of the limit controller 48" might be necessary.

Figure 6:
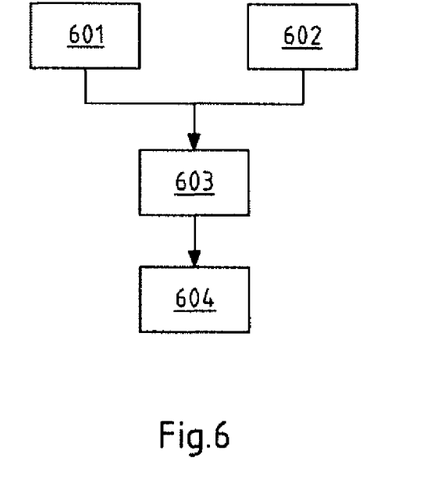
FIG. 6 shows a diagram of an exemplified embodiment of a method in accordance with the present disclosure.

FIG. 6 shows a diagram of an execution example of a method according to the present disclosure.

In a first step 601, for example, a grid operator can provide a power set point that is to be met by an offshore wind energy system. The power set point can be a power factor set point and/or a reactive power set point.

Preferably in parallel to step 601, at least one instantaneous reactive power state factor of the offshore wind energy system may be provided in step 602, as described for example in connection with FIGS. 2, 3 and/or 4.

Based on the provided power set point and the provided instantaneous reactive power state factor, an active power correction value can be determined, as also described for example in connection with FIGS. 2, 3 and/or 4.

After determining the active power correction value, this can be applied in particular to an active power controller of a control device of the offshore wind energy system. In step 604, for example, the active power of the offshore wind energy system can be controlled in dependence on the predetermined active power correction value in such a way that the power set point provided is at least complied with.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of controlling a power value of an offshore wind energy system comprising:
   providing a power set point, wherein the power set point is a power factor set point and/or a reactive power set point,
   providing at least one instantaneous reactive power state factor of the offshore wind energy system,
   determining an active power correction value depending on the provided power set point and the provided instantaneous reactive power state factor; and
   controlling of the active power of the offshore wind energy system as a function of the determined active power correction value so as to comply with the provided power set point value, wherein providing the instantaneous reactive power state factor comprises
   calculating the maximum available reactive power of the offshore wind energy system depending on the instantaneous operating condition of the offshore wind energy system, including at least one detected instantaneous switching state of the offshore wind energy system and/or at least one instantaneous measured grid voltage of the offshore wind energy system and/or at least one instantaneous operating point of at least one wind turbine of the offshore wind energy system, and at least one predetermined reactive power resource parameter of the offshore wind energy system, wherein the reactive power resource parameter indicates for a component of a plurality of components of the offshore wind energy system the amount of reactive power demand caused by the component.

2. The method according to claim 1, wherein
   determining the active power correction value comprises calculating a maximum admissible active power set point depending on the calculated maximum available reactive power, and
   the active power of the offshore wind energy system is controlled as a function of the calculated maximum admissible active power set point.

3. A method of controlling a power value of an offshore wind energy system comprising:
   providing a power set point, wherein the power set point is a power factor set point and/or a reactive power set point,
   providing at least one instantaneous reactive power state factor of the offshore wind energy system,
   determining an active power correction value depending on the provided power set point and the provided instantaneous reactive power state factor; and
   controlling of the active power of the offshore wind energy system as a function of the determined active power correction value so as to comply with the provided power set point value, wherein providing the instantaneous reactive power state factor comprises
   directing at least one manipulated variable relating to at least one wind turbine from a control device of the offshore wind energy system to a control extension device,
   wherein the manipulated variable comprises a physical relationship to the instantaneous reactive power of the offshore wind energy system, including reactive power, reactive current, phase angle of the complex apparent power or the current; component of the generator stator voltage directly influencing the reactive power; component of the rotor voltage directly influencing the reactive power; component of the generator stator flux chain directly influencing the reactive power; component of the grid-side converter voltage directly influencing the reactive power excitation currents; switching state of a reactive power compensation unit, and
   determining the active power correction value by the control extension device as a function of the provided manipulated variable, wherein at least one dead band region is preset in the control extension device in such a way that the control extension device of the offshore wind energy system is activated only when a limitation of the dead band region of the control device is reached.

4. The method according to claim 3, wherein
   an output variable of a reactive power controller of the control device is fed to the control extension device as a first manipulated variable,
   a deviation of an input variable of the reactive power controller of the control device is fed to the control extension device as a second manipulated variable, and
   the first manipulated variable and the second manipulated variable are added to form a summed control variable for the control extension device.

5. The method according to claim 3, wherein
   a dead band value corresponding to the output limitation of the reactive power controller of the control device is provided as dead band range,
   a differential value is formed from the summed control variable and the dead band value and the differential value is fed to a first controller of the control extension device,
   a summed value is formed from the summed control variable and the dead band value and the summed value is fed to at least one further controller of the control extension device, and
   wherein the output variable is fed from one of the controllers to an active power controller as an active power correction value.

6. The method according to claim 3, wherein the control extension device comprises at least one controller from the following group:
   PI controller,
   I controller,
   Fuzzy controller,
   Monte Carlo controller,
   Controller comprising a neural network, and
   Particle swarm controller.

7. A control apparatus, comprising:
   at least one input configured to receive a power set point, wherein the power set point is a power factor set point and/or a reactive power set point,
   at least one further input configured to receive at least one instantaneous reactive power state factor of the offshore wind energy system,
   at least one determining unit configured to determine an active power correction value depending on the provided power set point and the provided instantaneous reactive power state factor, and
   at least one output configured to pass the determined active power correction value to an active power controller configured to control the active power of the offshore wind energy system as a function of the passed active power correction value so as to comply with the power set point provided, wherein receiving the instantaneous reactive power state factor comprises calculating the maximum available reactive power of the offshore wind energy system depending on the instantaneous operating condition of the offshore wind energy system, including at least one detected instantaneous switching state of the offshore wind energy system and/or at least one measured instantaneous grid voltage of the offshore wind energy system and/or at least one instantaneous operating point of at least one wind turbine of the offshore wind energy system, and at least one predetermined reactive power resource parameter of the offshore wind energy system, wherein the reactive power resource parameter indicates for a component of a plurality of components of the offshore wind energy system the amount of reactive power demand caused by the component.

8. An offshore wind energy system, comprising:
at least one wind turbine, and
at least one control apparatus according to claim 7.

9. A control apparatus comprising:
at least one input configured to receive a power set point, wherein the power set point is a power factor set point and/or a reactive power set point,
at least one further input configured to receive at least one instantaneous reactive power state factor of the offshore wind energy system,
at least one determining unit configured to determine an active power correction value depending on the provided power set point and the provided instantaneous reactive power state factor, and
at least one output configured to pass the determined active power correction value to an active power controller configured to control the active power of the offshore wind energy system as a function of the passed active power correction value so as to comply with the power set point provided, wherein receiving the instantaneous reactive power state factor comprises directing at least one manipulated variable relating to at least one wind turbine from a control device of the offshore wind energy system to a control extension device, wherein the manipulated variable comprises a physical relationship to the instantaneous reactive power of the offshore wind energy system, including reactive power, reactive current, phase angle of the complex apparent power or the current; component of the generator stator voltage directly influencing the reactive power; component of the rotor voltage directly influencing the reactive power; component of the generator stator flux chain directly influencing the reactive power; component of the grid-side converter voltage directly influencing the reactive power excitation currents; switching state of a reactive power compensation unit, and determining the active power correction value by the control extension device as a function of the provided manipulated variable, wherein at least one dead band region is preset in the control extension device in such a way that the control extension device of the offshore wind energy system is activated only when a limitation of the dead band region of the control device is reached.

10. An offshore wind energy system, comprising:
at least one wind turbine, and
at least one control apparatus according to claim 9.

* * * * *